Oct. 17, 1967  TSUKUMO NOBUSAWA ET AL  3,347,141
CAMERA SHUTTER CONTROL DEVICE
Filed July 23, 1964
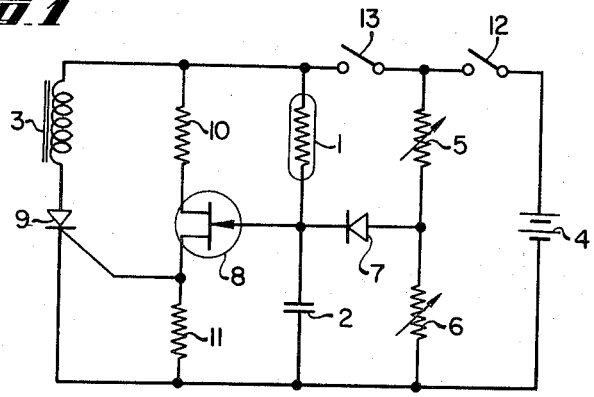
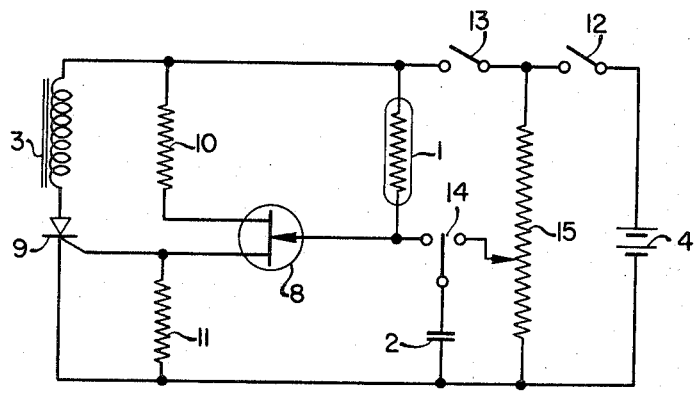
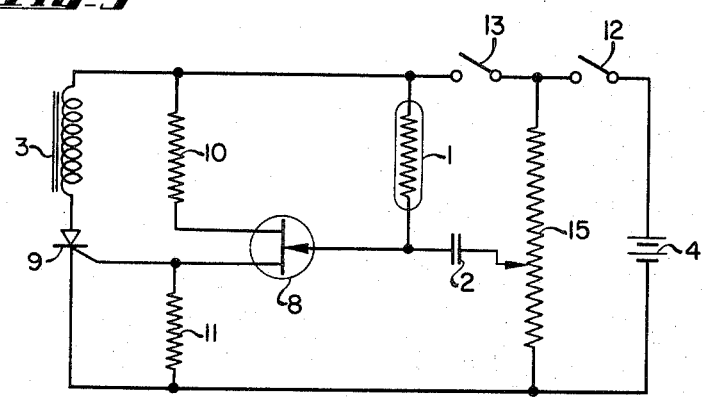
INVENTORS.
TSUKUMO NOBUSAWA
NAOYUKI UNO
BY
*Stanley Wolder*
ATTORNEY

United States Patent Office 3,347,141
Patented Oct. 17, 1967

3,347,141
CAMERA SHUTTER CONTROL DEVICE
Tsukumo Nobusawa, Asaka-machi, and Naoyuki Uno, Urawa-shi, Japan, assignors to Asahi Kogaku Kogyo Kabushiki Kaisha, Tokyo-to, Japan, a corporation of Japan
Filed July 23, 1964, Ser. No. 384,638
Claims priority, application Japan, July 27, 1963, 38/56,384, 38/56,385; Nov. 6, 1963, 38/83,875
10 Claims. (Cl. 95—10)

The present invention relates generally to improvements in shutter devices and it relates particularly to an improved apparatus for automatically effecting the closure of a camera shutter following the opening thereof in response to the incident light.

In automatic exposure controlled cameras it is a common practice to automatically regulate the lens diaphragm opening in accordance with the intensity of the incident light, the shutter speed and the film speed rating. The camera shutter speed has also been automatically regulated in response to the intensity of the incident light but the mechanisms heretofore available possess numerous drawbacks and disadvantages. They have been unreliable in their operation and have little feasibility and adaptability and otherwise leave much to be desired. A lens shutter control mechanism which has been proposed employs a capacitor which is charged through a photosensitive element to effect closing of the shutter upon the capacitor accumulating a predetermined charge which is a function of the incident light and the time. However, such a system did not possess sufficient adjustability and adaptability to permit its satisfactory and versatile use in a camera shutter control.

It is therefore a principal object of the present invention to provide an improved optical exposure device.

Another object of the present invention is to provide an improved camera shutter control device.

Still another object of the present invention is to provide an improved network for automatically controlling the closing time of a camera shutter in accordance with the intensity of the incident light.

A further object of the present invention is to provide an improved automatic light controlled shutter mechanism which is adjustable to various control parameters such as film speed, lens aperture, etc.

Still a further object of the present invention is to provide an improved network and device of the above nature characterized by its reliability, versatility, adaptability, and compactness.

The above and other objects of the present invention will become apparent from a reading of the following description, taken in conjunction with the accompanying drawing wherein:

FIGURE 1 is a circuit diagram of one embodiment of the present invention;

FIGURE 2 is a circuit diagram of another embodiment thereof; an

FIGURE 3 is a circuit diagram of a further embodiment thereof.

The present invention contemplates a camera shutter control network comprising a capacitor, means for charging said capacitor to a first predetermined voltage, means including a photosensitive element for varying the voltage on said charged capacitor at a rate responsive to the light incident on said photosensitive element, shutter control means responsive to a second predetermined voltage across said capacitor and means for varying one of said predetermined voltages.

According to a preferred form of the present network the voltage divider comprises a series coupled pair of rheostats connected across a voltage source defining battery, the capacitor being connected through a rectifier diode between the rheostat junction point and one battery terminal and through a photoresistance element and a first switch across the battery. A shutter closing solenoid is connected through the first switch and the output electrodes of a silicon controlled or gated rectifier across the battery, the gate or control electrode thereof being connected to the output of a unijunction transistor whose input is connected across the capacitor. In a modified network the two rheostats are replaced by a potentiometer whose resistance element is connected across the battery and whose arm is connected to one pole of the double throw switch the other pole of which is connected through the photoresistance element to a first battery terminal. The switch arm is connected through the capacitor to the opposite second battery terminal. According to a further embodiment, the potentiometer arm is connected through the capacitor to the unijunction transistor control electrode and through the photoresistance element to a battery terminal.

The present invention contemplates to effect more accurate controlling operation of such controlling system and further to provide arrangement according to which said controlling system can operate in accordance with such conditions as film sensitivity or diaphragm value in a ready and accurate manner.

Referring now to FIGURE 1 of the drawing which illustrates a photoelectric exposure time controlling shutter network having a timing circuit for controlling the operation of shutter closing electromagnetic relay of solenoid 3, the timing circuit comprises a charging circuit which includes a light receiving photoresistance element 1 such as a cadmium sulphide cell and a capacitor 2 connected in series across a power or voltage source defining battery 4. There are provided a pair of variable resistors or rheostats 5 and 6 which are connected in parallel with said charging circuit so as to define a voltage dividing network across the power source 4, said variable resistors being adjustable in accordance with such photographing conditions or parameters other than object illumination, as film sensitivity or diaphragm value, and further, a rectifying element 7 such as a diode is connected between the junction of the variable resistors 5 and 6 and the junction of the light receiving photoresistance element 1 and the capacitor 2 together in such a manner that the voltage dividing circuit current only can flow through said rectifying element 7.

A unijunction transistor 8 is controlled by the terminal voltage of the capacitor 2, and the resulting output of said transistor 8 is applied, as a gate voltage, to a switching control element defining silicon controlled rectifier 9 whose output is connected to the power supply circuit through the electromagnetic solenoid 3. Further as shown in the drawing there are provided an input circuit resistor 10 for the transistor 8, another resistor 11 for stabilizing the operation of the switching control element 9, a power source switch 12, and another switch 13 to be closed due to or in a movement coupled to the shutter triggering or opening operation and connected through the switch 12 between the upper terminal of the battery 4 and the photoresistance element 1, solenoid 3 and transistor 8 and rectifier 9.

The operation of the arrangement as shown in FIGURE 1 is as follows:

With the above described arrangement built into a photographic camera, as a preliminary operation prior to photographing the power source switch 12 is closed. The current then flows through the rectifying element 7 under the divided voltage adjusted by variable resistors 5 and 6 and charges the capacitor 2 to a preadjusted voltage. The amount of this charge on the capacitor 2 is controlled by the voltage dividing ratio of power source 4 by means of variable resistors 5 and 6, and the charging of the capacitor is effected substantially instantaneously.

During the above capacitor charging operation the switch 13 is open so that power is not supplied from the power source 4 to the charging circuit of the capacitor 2 by means of the light receiving photoresistance element 1 and to the power supply circuit for the electromagnetic relay 3 including the transistor 8.

When the switch 13 is closed in a movement coupled to the shutter opening operation, the capacitor 2 begins to be further charged through the light receiving element 1. At the same time, the power supply circuit for the electromagnetic relay 3 is closed. However, the terminal voltage of the capacitor 2 due to the charge resulting from said divided voltage current is not enough to generate sufficient output of the transistor 8 controlled by said terminal voltage to open the gate of the switching control element 9 for permitting the current to flow through the electromagnetic relay 3, so that the relay 3 remains inoperative.

The amount of charge of the capacitor 2 due to the light receiving element 1 increases with lapse of time until the terminal voltage of said capacitor 2 reaches a predetermined value, when the output current of the transistor 8, which is controlled by said terminal voltage, opens the gate of the switching control element 9 and supplies power from the power source 4 to the relay 3. Thus the relay 3 is actuated and closes the shutter.

As the arrangement of the present invention operates in the above mentioned manner, the exposure time duration, namely the time during which the shutter remains open, is the time duration between the time when the switch 13 is closed in a movement coupled to the shutter opening operation and the time when the relay 3 is closed. This exposure time corresponds to the time required for causing the terminal voltage of the capacitor 2 controlled by the light receiving element 1 to rise up to the predetermined value. Since the light receiving element 1 controls the charging operation in response to the light incident thereon the object illumination or a properly exposed photographing operation can be carried out with this exposure time.

In the arrangement according to the present invention, before the capacitor 2 is charged through the light receiving element 1, the capacitor 2 has been charged through the voltage dividing circuit, even if the light receiving face brightness of the element 1 is constant, by adjusting the variable resistors 5 and 6 and accordingly the charge amount of the capacitor 2 due to said voltage dividing circuit, the exposure time, that is, the actuating time of the relay 3, can be quickened or delayed. Thus, by determining the ratio of said voltage dividing resistors 5 and 6 in accordance with film sensitivity or diaphragm value, an appropriate exposure time can be effected which is in accordance with photographing conditions and parameters other than object illumination. When the values of variable resistors 5 and 6 are adjusted in accordance with said conditions of film sensitivity or diaphragm value, the preliminary charging voltage of the capacitor 2 is set in such a manner that when, for example, a film of higher sensitivity is used, by raising the preliminary charging voltage an automatic exposure time control can be carried out in a ready and accurate manner in accordance with such photographing conditions.

Referring now to FIGURE 2 of the drawing which shows the circuit of another embodiment of the present invention and in which the same numerals as those in FIGURE 1 are used for circuit elements having the same functions and effects as the corresponding circuit elements of FIGURE 1. Instead of the variable resistors 5 and 6 of FIGURE 1 which are adjustable in accordance with film sensitivity or diaphragm value, there is provided a variable resistor or potentiometer 15 having a voltage dividing terminal which can be set in accordance with film sensitivity, diaphragm value or the correlation between these two values. A change-over double throw switch 14 is inserted in the input circuit of the capacitor 2 so as to be alternately connected to the voltage dividing terminal of the variable resistor 15 or to the output terminal of the light receiving photosensitive element 1, said change-over switch 14 being further so arranged as to be coupled to a switch 13 which is closed simultaneously with or in a movement coupled to shutter opening operation.

Accordingly, in a movement coupled for example to the first stage movement of shutter release lever depressing operation before shutter opening, the capacitor 2 in the shutter timing circuit is preliminarily charged by the closing of the switch 12, as in the case of the arrangement of FIGURE 1 by the current derived through the divided voltage due to the adjustment of the variable resistor 14 in accordance with the film sensitivity, the diaphragm value or the correlation between these two values.

Upon closure of the switch 13 which is actuated simultaneously with, or in a movement coupled to, the shutter opening movement, the switch 14 is changed over and a photocurrent controlled by the light receiving element 1 flows into the capacitor 2. When the terminal voltage of the photocurrent charged capacitor 2 reaches the predetermined value, the same operation as that of the arrangement of FIGURE 1 is effected and the relay or solenoid 3 is actuated and the shutter is closed. Accordingly, there is carried out an automatic exposure time controlling operation which is similar to that of the arrangement of FIGURE 1 with the shutter closing time constant represented by the time required by the terminal voltage of the capacitor 2 to reach the predetermined value and which is performed in accordance with the film sensitivity, the diaphragm value or the correlation between these two values.

In the arrangement as shown in FIGURE 3, there is provided a voltage divider circuit having a variable resistor 15 which is similar to that shown in the arrangement of FIGURE 2 and is adjusted in accordance with the film sensitivity, the diaphragm value or the correlation between these two values. The capacitor 2 is biased by the voltage resulting from said voltage divider circuit, and the timing circuit is constituted by the light receiving element 1 and the capacitor 2 connected together in series. Thus, an automatic exposure time controlling operation which is similar to that of the arrangement of FIGURE 2 is carried out with the capacitor 2 which is biased in accordance with the film sensitivity, the diaphragm value or the correlation between these two values.

As mentioned above, according to the arrangement of the present invention, proper exposure time can be advantageously obtained for automatic controlling operation in accordance with such photographing conditions as the film sensitivity and diaphragm value, in a ready manner.

It should be noted that on repeated use of the above arrangements, simultaneously with opening of the power source switch 12 and the operation switch 13, the capacitor 2 can be short-circuited so as to be placed under the condition prior to the charging operation through the light receiving element 1; and further, adjustment of the voltage dividing ratio of the voltage dividing circuit can also be carried out not by means of a variable resistor but by a multi-stage resistor switching or change-over operation.

While there have been described and illustrated preferred embodiments of the present invention, it is apparent that numerous alterations, omissions and additions may be made without departing from the spirit thereof.

What is claimed is:

1. A camera shutter control network comprising a voltage source including opposite first and second terminals, a voltage divider connected between said first and second terminals and including a voltage adjustable third terminal between the ends thereof, a photoresistance element, a capacitor, means for connecting said capacitor independently of said photoresistance element between said second and third terminals and means for connecting said capacitor in series with said photoresistance element between said first and third terminals, and a shutter control solenoid responsive to the voltage on said capacitor.

2. A camera shutter control network comprising a voltage source including opposite first and second terminals, a voltage divider connected between said first and second terminals and including a voltage adjustable third terminal between the ends thereof, a photoresistance element, a diode rectifier, a capacitor connected in series with said diode rectifier between said second and third terminals and means for connecting said capacitor in series with said photoresistance element between said first and third terminals, and a shutter control solenoid responsive to the voltage on said capacitor.

3. A camera shutter control network comprising a voltage source including opposite first and second terminals, a voltage divider connected between said first and second terminals and including a voltage adjustable third terminal between the ends thereof, a first normally open switch, a photoresistance element, a capacitor, means for connecting said capacitor between said second and third terminals independently of said photoresistance element and means for connecting said capacitor in series with said photoresistance element and said switch between said first and third terminals, and a shutter control solenoid responsive to the voltage on said capacitor.

4. A camera shutter control network comprising a voltage source including opposite first and second terminals, a voltage divider connected between said first and second terminals and including a voltage adjustable third terminal between the ends thereof, a first normally open switch, a photoresistance element, a capacitor, means for connecting said capacitor between said second and third terminals and in series with said photoresistance element and said switch between said first and second terminals, a shutter control solenoid, and an amplifier having an output connected through said solenoid and said switch to said first terminal and an input coupled across said capacitor.

5. The shutter control network of claim 4 comprising a second switch, said voltage divider being connected between said first and second terminals through said second switch.

6. The shutter control network of claim 4 including a rectifier diode, said capacitor being connected to said third terminal through said diode rectifier.

7. The shutter control network of claim 4 comprising a double throw switch including an arm and opposite contacts, said capacitor being connected between said switch arm and said second terminal, said first contact being connected to said third terminal and said first terminal being connected through said photoresistance element to said second contact.

8. The shutter control network of claim 4 wherein said capacitor is connected to said second terminal through said amplifier input.

9. The shutter control network of claim 4 wherein said amplifier comprises a signal controlled rectifier including output electrodes connected between said solenoid and said second terminal and a control electrode and an amplifier transistor having an output connected to said control electrode and an input connected across said capacitor.

10. The shutter control network of claim 9 wherein said transistor is of the unijunction type.

References Cited
UNITED STATES PATENTS

| | | | |
|---|---|---|---|
| 2,666,858 | 1/1954 | Levine | 250—214 |
| 3,020,816 | 2/1962 | Frenk. | |
| 3,033,988 | 5/1962 | Edgerton. | |
| 3,063,354 | 11/1962 | Matulik et al. | 95—10 |
| 3,109,964 | 11/1963 | Winchel | 317—148.5 |
| 3,144,568 | 8/1964 | Silliman et al. | 307—88.5 X |

NORTON ANSHER, *Primary Examiner.*

JOSEPH F. PETERS, JR., *Assistant Examiner.*